(12) United States Patent
Knowles (10) Patent No.: US 12,346,284 B2
(45) Date of Patent: Jul. 1, 2025

(54) NETWORK COMPUTER WITH EXTERNAL MEMORY

(71) Applicant: Graphcore Limited, Bristol (GB)

(72) Inventor: Simon Christian Knowles, Wiltshire (GB)

(73) Assignee: GRAPHCORE LIMITED, Bristol (GB)

( * ) Notice: Subject to any disclaimer, the term of this patent is extended or adjusted under 35 U.S.C. 154(b) by 225 days.

(21) Appl. No.: 17/931,321

(22) Filed: Sep. 12, 2022

(65) Prior Publication Data
US 2023/0084132 A1   Mar. 16, 2023

Related U.S. Application Data

(63) Continuation-in-part of application No. 17/930,980, filed on Sep. 9, 2022, now abandoned.

(51) Int. Cl.
*G06F 15/173*   (2006.01)
*G06F 13/16*    (2006.01)
*G06F 15/167*   (2006.01)

(52) U.S. Cl.
CPC .... *G06F 15/17375* (2013.01); *G06F 13/1663* (2013.01); *G06F 13/1678* (2013.01); *G06F 15/167* (2013.01)

(58) Field of Classification Search
CPC ........... G06F 15/17375; G06F 13/1663; G06F 13/1678; G06F 15/167
USPC .......................... 710/15, 20, 33, 52, 61, 305
See application file for complete search history.

(56) References Cited

U.S. PATENT DOCUMENTS

| | | | | |
|---|---|---|---|---|
| 5,163,149 A * | 11/1992 | Brantley, Jr. | ..... | G06F 15/17375 711/147 |
| 7,941,449 B2 * | 5/2011 | Liu | ......... | G06F 16/25 706/55 |
| 11,734,214 B2 * | 8/2023 | Youn | ............ | G06F 13/4027 710/306 |
| 2008/0082547 A1 * | 4/2008 | Hwang | ............ | G06Q 10/10 |
| 2008/0140633 A1 * | 6/2008 | Holt | ............ | G06F 9/526 |

(Continued)

FOREIGN PATENT DOCUMENTS

WO   WO-2009043146 A1 *   4/2009   ............. H04L 12/66

*Primary Examiner* — Idriss N Alrobaye
*Assistant Examiner* — Henry W Yu
(74) *Attorney, Agent, or Firm* — HAYNES AND BOONE, LLP (57) ABSTRACT

A computer comprising a plurality of processor devices connected in a ring, wherein each of the processor devices is connected to each of two neighbouring ones of the processor devices by a respective physical inter-processor link. Each of a set of external memory device stores a local portion of the externally stored dataset. Each processor device executes instructions to: determine that a synchronisation point has been reached by the plurality of processor devices; responsive to the determination, access from its connected external memory device its local portion of the externally stored dataset stored; record a copy of its local portion of the externally stored dataset in its local memory; transmit its local portion of the externally stored dataset to at least one of its connected neighbouring processing devices; and receive an incoming portion of the externally stored dataset from at least one of its connected neighbouring processing devices.

20 Claims, 8 Drawing Sheets

(56) References Cited

U.S. PATENT DOCUMENTS

| | | | |
|---|---|---|---|
| 2009/0265485 A1* | 10/2009 | Pong | G06F 13/4247 711/E12.001 |
| 2011/0225588 A1* | 9/2011 | Pollock | H04L 12/56 718/102 |
| 2013/0097393 A1* | 4/2013 | Ninomiya | G06F 12/0223 711/E12.001 |
| 2014/0365597 A1* | 12/2014 | Boehmer | G06F 15/17331 709/213 |
| 2015/0173114 A1* | 6/2015 | Watanabe | H04W 8/26 370/329 |
| 2020/0234147 A1* | 7/2020 | Kim | G06N 3/045 |
| 2022/0321489 A1* | 10/2022 | St-Denis | H04L 49/9084 |

\* cited by examiner

| | P1 | P2 | P3 | P4 |
|---|---|---|---|---|
| | VPa → LM1 | VPc → LM2 | VPe → LM3 | VPg → LM4 |
| | VPb → LM1 | VPd → LM2 | VPf → LM3 | VPh → LM4 |
| | VPa → P2 | VPc → P1 | VPe → P2 | VPg → P3 |
| | VPb → P4 | VPd → P3 | VPf → P4 | VPh → P1 |
| | VPc → P4 | VPa → P3 | VPg → P2 | VPf → P1 |
| | VPh → P2 | VPe → P1 | VPd → P4 | VPb → P3 |
| | VPf → P2 | VPh → P3 | VPb → P2 | VPc → P3 |
| | VPe → P4 | VPg → P1 | VPa → P4 | VPd → P1 |
| | Local Access | Forward 1 | Forward 2 | Forward 3 |

Figure 8

NETWORK COMPUTER WITH EXTERNAL MEMORY

CROSS-REFERENCE TO RELATED APPLICATIONS

The present application is a Continuation-in-Part of U.S. patent application Ser. No. 17/930,980, filed Sep. 9, 2022, which claims priority to United Kingdom Patent Application No. GB2112936.6, filed Sep. 10, 2021, the disclosures of which are hereby incorporated herein by reference in their entireties.

FIELD

The present disclosure relates to a network computer with external memory, and particularly but not exclusively for improving access to data stored in the external memory for processing machine learning/artificial intelligence applications.

BACKGROUND

As will be familiar to those skilled in the art of machine intelligence, machine intelligence algorithms are capable of learning a model of exemplary data (the training data), and then using that model to perform inference functions on previously unseen data of similar character. In particular, such a model may be trained jointly on exemplary input and output data of a system, such that the model captures a mapping between the two, and can subsequently be used to generate appropriate output response for previously unseen input data. The model can be considered as acquiring knowledge about its training data, and using that knowledge to generalize about new data of similar character. The model comprises algorithms for learning and inference, often a joint such algorithm, and a set of learned parameters which capture the salient characteristics of the training data relevant to that algorithm. There is typically a large number of parameters, comparable with the number of data seen during training. The parameters are often organized in a computer and manipulated by the training and inference algorithms as vectors, matrices, or higher-order tensors. A machine intelligence model can be represented as a graph of multiple interconnected nodes. Each node represents a function of its inputs. Some nodes receive the inputs to the graph and some receive inputs from one or more other nodes. The output activation of some nodes forms the inputs of other nodes, and the output of some nodes provide the output of the graph, and the inputs to the graph provide the inputs to some nodes. Further, the function at each node is parametised by one or more respective parameters, e.g. weights. During a learning (also known as training) process, the aim, based on a set of experiential input training data, is to find values for the various parameters (e.g. weights) such that the graph as a whole will generate a desired output for a range of possible inputs. In other words, the system will learn to generalize from the training data, such that it is able to respond appropriately to previously unseen data of similar character. Over multiple iterations, the parameters are gradually tuned to decrease the error in some measurement of "appropriate response", and thus the model converges towards a solution of sufficient accuracy. In a subsequent inference process, the learned model (the converged graph) can then be used for example to make predictions of outputs given a specified set of inputs or to make inferences as to inputs (causes) given a specified set of outputs.

As the size of a parameter (also called weight) structure, such as a vector, increases, it may not be practical to hold the vector (or matrix or higher-order tensor) in local memory of a processing node. Recourse has to be made to external memory which is connected to that processing node, in order to increase the memory capacity for storing large data sets such as vectors.

When an external memory is implemented to store data sets externally of a processing node, the processing node needs to access that memory when it has a requirement for that data set. Any access path to an external memory has a certain bandwidth (the capacity of the access path to convey data between the external memory and the processing node).

So called high bandwidth memories (HBMs) are presently implemented by providing memory within the physical structure of a processing node itself. That is, the memory is provided in close proximity to a logic chip implemented on a silicon substrate within a package. That is, they form part of the packaged processing device. In practice, the HBM is a stack of silicon chips which must be butted up against the logic chip which will access the memory, both mounted together on a silicon substrate to enable the required density of wiring between memory (HBM) and logic (for example a processor device). High bandwidths have been achieved in this way but there is a limit on capacity based on the physical size of the memory which can be accommodated in this kind of structure. Moreover, such HBMs are expensive to manufacture and the assembly incorporating the silicon substrate is also expensive to manufacture.

These limitations mean that this kind of memory has very limited application to the storage of large data sets, for example matrices in AI/machine learning applications.

Presently, the lack of availability of a high capacity high bandwidth memory poses constraints on the size and nature of models which can be utilised in machine learning/artificial intelligence computers. In particular, the acquired knowledge capacity of a machine-learned model is directly related to the capacity of reasonably accessible memory.

SUMMARY

The present inventor seeks to address this problem by making use of high capacity memories in a novel method and architecture. High capacity memories are known but they are not mounted within the same package as the logic chip (processor). For this reason, they suffer from significant bandwidth constraints. For example, dynamic random access memories (DRAMS) may be mounted on dual inline memory modules (DIMMs) on server racks. These can provide a scaleable capacity of the order of terabytes. Such DIMMs may be mounted vertically in a server rack, and many can be stacked together to provide the memory capacity required for the network processor. Note that these DIMMs do not form part of the packaged processing device (processing node) itself, but are external. That is, external wires or other routing paths are needed to enable the processing node to access the DRAMs on the DIMMs. Such physical electrical pathways may involve wiring which is long and narrow, with constraints therefore on bandwidth of access to such memories. In particular, the bandwidth is significantly reduced when compared with a silicon substrate within a package as in the implementation of HBMs described above. Each DIMM may support only 25-50 GByte per second bandwidth. A processing node may support access to multiple DIMMS.

A measure of processor efficiency may be given by the ratio of the amount of work done by the processor divided by the access to memory measured in flops (operations per second) per byte. What is needed is to overcome the constraints of the bandwidth of externally mounted memory to improve access efficiency towards the efficiency of HBMs, while retaining the potential capacity of memory mounted externally to the packaged processing device.

According to one aspect of the present invention, there is provided a computer for executing an operation on locally stored data and an externally stored dataset, the computer comprising:

a plurality of processor devices, each of the processor devices having local memory and being connected to at least one external memory device via a physical processor—memory link, the processor devices being connected in a ring wherein each of the processor devices is connected to each of two neighbouring ones of the processor devices by respective physical inter-processor links, wherein the local memory of each processor device holds locally stored data, wherein each external memory device stores a local portion of the externally stored dataset, the externally stored dataset being collectively stored in the external memory devices connected to the plurality of processor devices, and wherein each processor device is configured to execute computer readable instructions of a computer program which operates the computer according to the following method;

determining that a synchronisation point has been reached by the plurality of processor devices of the computer, responsive to the determination, accessing from its connected at least one external memory device via the physical end processor—memory link, its local portion of the externally stored dataset stored in its at least one external memory device, recording a copy of its local portion of the externally stored dataset in its local memory, transmitting its local portion of the externally stored dataset to the at least one of its connected neighbouring processing devices via the respective physical inter-processor link, and receiving an incoming portion of the externally stored dataset from at least one other of its connected neighbouring processing devices, the incoming portion being a further local portion held in the external memory device connected to the at least one other connected neighbouring processing device whereby, for execution of the operation, each of the plurality of processor devices has recorded in its local memory a copy of all portions of the externally stored dataset for operating on their locally stored data.

The above-defined computer operates with particular advantage where the bandwidth of each inter-processor link is greater than the bandwidth of each physical processor-memory link. For example, for a ring of four processor devices, it may be three times as large.

The locally stored data may be a portion of a first dataset, the first dataset being collectively stored in the local memories of the plurality of the processor devices.

In certain embodiments, while the externally stored local portions are being downloaded (recorded in the local memory of their respective memory device), they are also simultaneously being transmitted around the ring to be received by the other processor devices and recorded in their local memories.

The locally stored data may be an onboard vector and the externally stored dataset may be an external vector, wherein the operation is a vector multiplication, such as a dot product.

The processor devices may be an intelligent processing unit (IPU) as described in U.S. application Ser. No. 15/886,009, the contents of which are incorporated by reference. Such an IPU has multiple processor tiles.

The onboard vector may be stored over a plurality of individual tiles on each of the processor devices.

The collection together in each local memory of all portions of the externally held dataset may be considered a class of an Allgather operation. A corresponding Reduce-scatter operation may additionally or alternatively be effected.

According to another aspect of the present invention, there is provided a computer for executing an operation to apply an external vector to an onboard vector, the computer comprising:

four processor devices, each processor device having local memory and being connected to two external memory devices via respective physical processor—memory links, each of the processor devices being further connected to each of two neighbouring processing devices of the computer via respective physical inter-processor links, wherein the bandwidth of each inter-processor link is three times the bandwidth of the physical processor-memory link, each local memory storing a portion of the onboard vector, the onboard vector being collectively stored in the local memories of the four processor devices of the computer, each external memory device storing a local portion of the external vector, the external vector being collectively stored in the eight external memory devices, each processor device configured to execute computer readable instructions of a computer program which operates the computer according to the following method:

determining that a bulk synchronisation point has been reached by the four processor devices, responsive to the determination accessing from its two memory devices the local portion of the external vector stored in the two memory devices, recording the portion of the external vector in its local memory, transmitting the local portion of the external vector to each of the connected neighbouring processor devices and receiving from each of the neighbouring processor devices an incoming portion of the external vector, the incoming portion being a local portion held in the two memory devices connected to each of the neighbouring processor devices. Another aspect of the disclosure provides a method of operating a computer to execute an operation on locally stored data and an externally stored dataset, the method comprising:

causing a first processor device to determine that a synchronisation point has been reached by a plurality of processor devices of the a computer, the plurality of processor devices including the first processor device, responsive to the determination, accessing from at least one external memory device connected to the first processor device a local portion of an externally stored dataset, the local portion of the externally stored dataset being stored in the at least on external memory device, wherein the step of accessing is carried out via a physical processor memory-link connecting the first processor device to the at least one external memory device, recording a copy of the local portion of the externally stored dataset in a local memory of the first processor device, transmitting the local portion of the externally stored dataset to at least a second processor device which is connected to the first processor device via a physical inter-processor link, and receiving an incoming portion of the externally stored dataset from a third processing device, the third processing processor device connected to the second processor device via a second physical inter-processor memory link, and executing the operation using all received portions of the externally stored dataset and locally stored data. In some embodiments, the first processor device is caused to implement the method by executing computer readable instructions of a computer program distributed over the plurality of processor devices of the computer.

In some embodiments, the method comprises recording in the local memory of the first processor device the incoming portion of the externally stored dataset and transmitting that incoming portion of the externally stored dataset to the third second processor device.

The method may be carried out during an exchange step wherein the steps of accessing, recording, transmitting and receiving are carried out in an exchange phase of a bulk synchronisation protocol.

The operation may be carried out in a compute phase of the bulk synchronisation protocol.

In some embodiments, the step of accessing is carried out from each of the processor memory devices of connected to the plurality of processor devices at the same time and responsive to the determination that the synchronisation point has been reached.

Another aspect of the disclosure provides a non-transitory computer readable media on which is stored computer readable instructions which cause a processor device to implement the following method:

determining that a synchronisation point has been reached by a plurality of processor devices in the computer in which the processor device is connected;

responsive to the determination, accessing via a physical processor-memory link a local portion of an externally stored dataset stored in at least one external memory device connected to the processor device via the physical processor-memory link, recording a copy of the local portion of the externally stored dataset in a local memory, transmitting the local portion of the externally stored dataset from a first interface to a first connected processor device, receiving an incoming portion of the externally stored dataset from a second connected processor device via a second interface and recording the incoming portion of the externally stored dataset in the local memory, transmitting the incoming portion of the externally stored dataset via the first interface; and performing an operation using all portions of the externally stored dataset and the locally stored data.

BRIEF DESCRIPTION OF THE DRAWINGS

For a better understanding of the present invention and to show how the same may be carried into effect reference will now be made by way of example to the accompanying drawings.

DESCRIPTION OF PREFERRED EMBODIMENTS

The present disclosure describes a networked computer comprising a plurality of inter-connected processing nodes and a method of operating the networked computer in a way which simultaneously improves high bandwidth for retrieving data from external memories and the ability to use high capacity memories.

The present disclosure addresses certain problems which arise in the handling of very large datasets. For example, in machine intelligence models it is often necessary to perform compute operations involving two datasets. At least one of these datasets may be extremely large. In certain situations, both datasets may be extremely large. The size of the dataset is relative to the capacity of a memory device to hold that dataset in a manner which renders it accessible to one or more processing nodes which will perform the compute operation. Individual processing nodes may not have the memory capacity to hold the required data in their local memory other than to perform the compute operation, after which it will need to be overwritten for a subsequent compute operation.

One particular field in which this arises is in the field of machine intelligence models, although the techniques and architectures described herein may be applicable to any other scenarios where there is a need to handle datasets which cannot all be stored in the local memory of a processing node. Instead, recourse has to be made to external memory, which is connected to that processing node, in order to increase the memory capacity for handling large datasets.

The presently described techniques and architectures may be used to facilitate any type of compute operation. A compute operation which is particularly prevalent in machine intelligence processes is vector multiplication. One scenario is where a local vector (or part of a vector) which is held at a processing node needs to be multiplied by another vector received from another source of data. That vector may itself be held in an external memory (that is, external to the processing node). One form of vector multiplication is formation of a dot product of the vector elements to generate a multiplication result. The result of a dot product of two vectors is a scalar result.

Vector multiplication may be carried out in the context of multiplication of a vector by a matrix (where each row or column of the matrix may be considered a two-dimensional vector), or in higher order arrays. One particular operation which is frequently used in machine learning/artificial intelligence processing systems is a convolution operation, although it will be apparent that the techniques and architectures described herein may be applied for many other kinds of operations. A convolution operation is discussed later with reference to FIG. 1.

In the present description, the term "on board" is used to described data which is held in the local memory of a processing node. That data could be a vector, or part of a vector or a vector of vectors. The term "external" when applied to a dataset indicates that that dataset is stored externally of the processing node, for example in external memory which may be connected to the processing node by a physical connection path. For example, an external dataset may be an external vector, a matrix, a vector of vectors or any other dataset. The techniques and architectures described herein are particularly useful when the external dataset is very large and is such that it cannot be stored in the external memory associated with one particular processing node.

Figure 3:
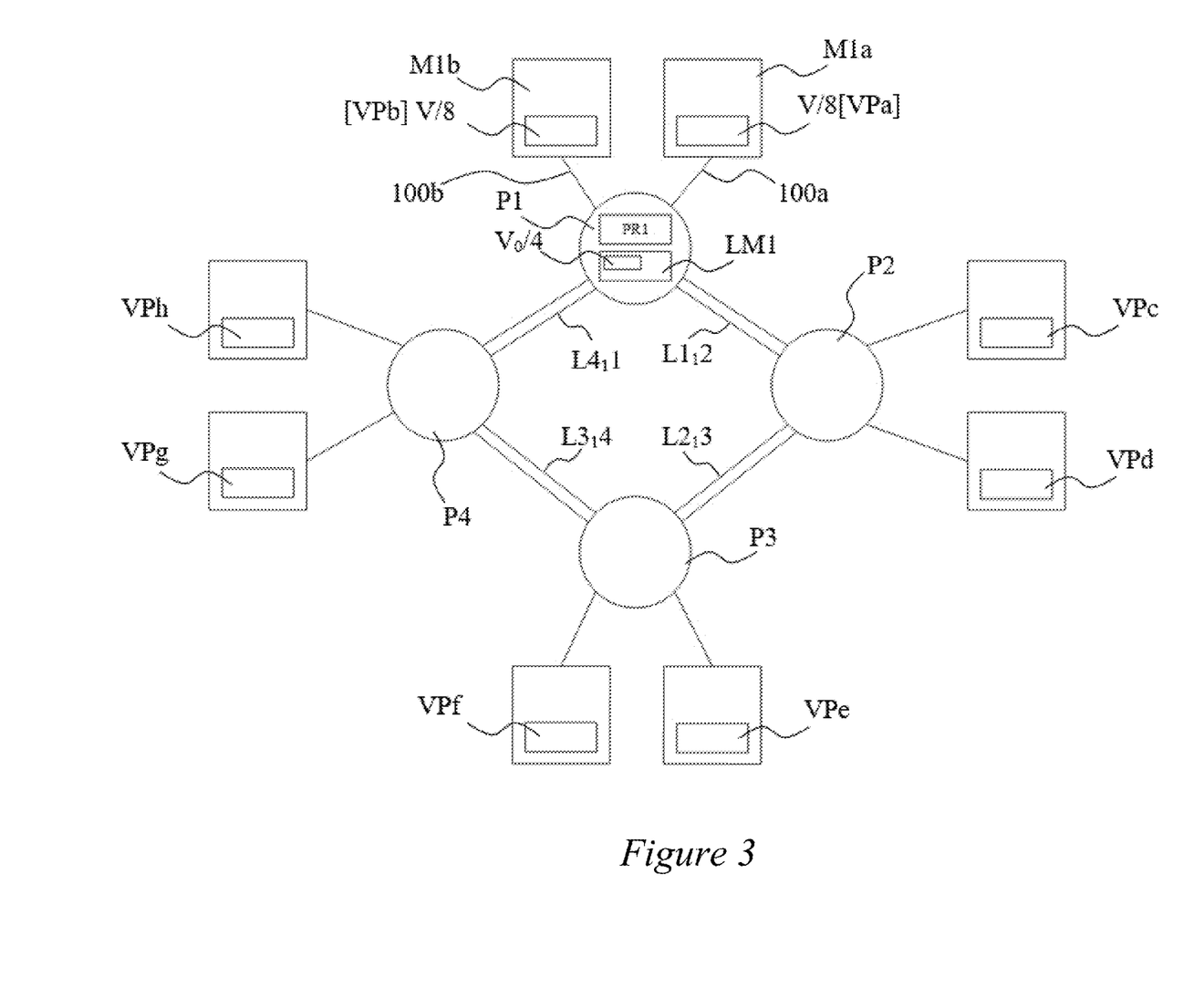
FIG. 3 is a schematic diagram of processing nodes interconnected in a ring for receiving and forwarding matrix portions.
Figure 7:
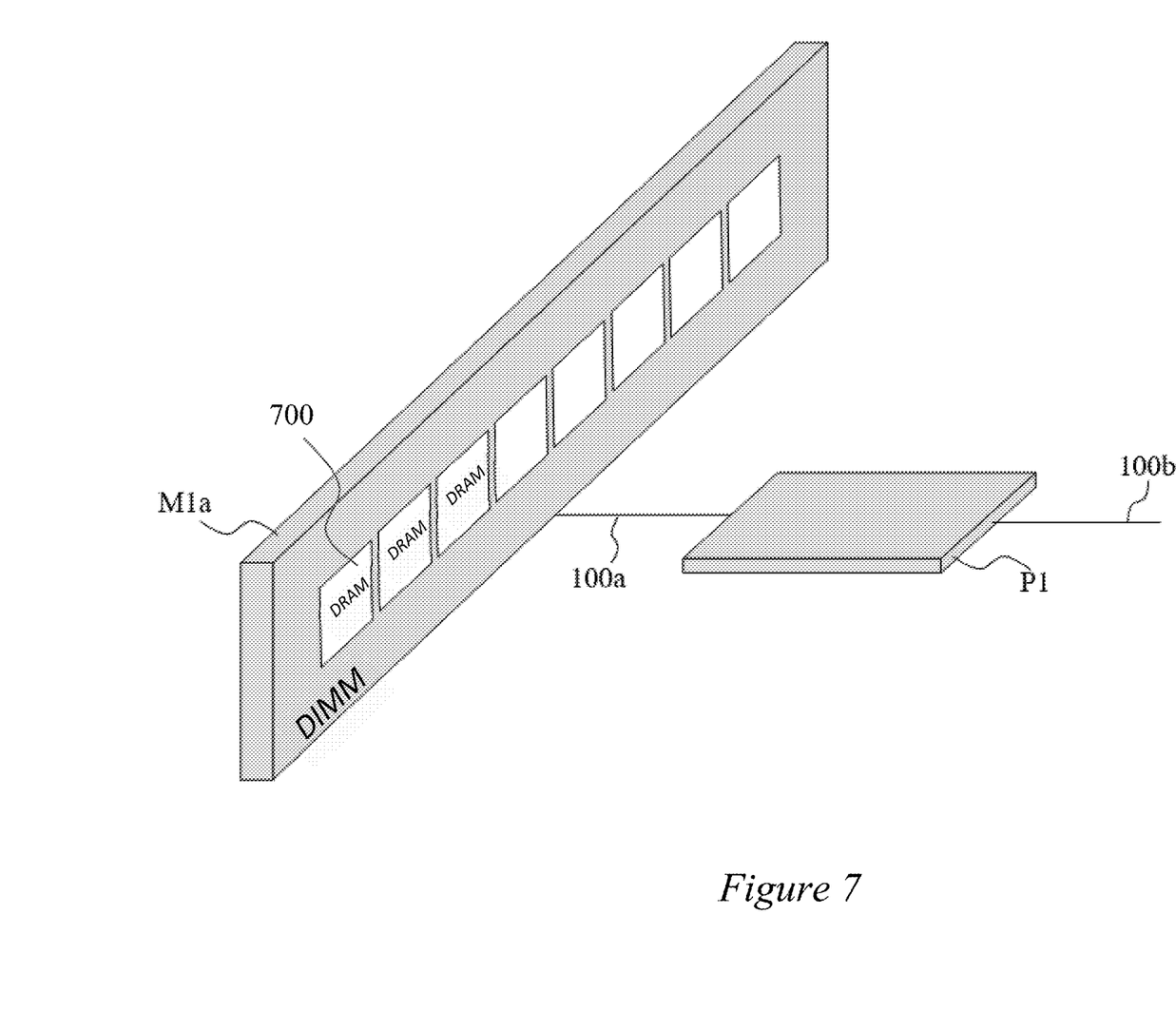
FIG. 7 is a schematic diagram of an external DIMM memory connected to a processing node.

FIG. 3 is a schematic diagram of four processing nodes connected in a ring. Each processing node P1, P2, P3, P4 connected to external memory. In this case, the term "external memory" indicates memory for which an external connection path between the processing node and the memory is required. For example, physical electrical wiring may be needed to connect the processing node to the external memory. Reference is made to FIG. 7 to show in highly schematic form the connection between a processing node P1 and its external memory. In the diagram of FIG. 7, the external memory shown attached to the processing node P1 is in two separate parts, only one of which (part M1$a$) is shown. It will readily be appreciated that a single external memory may also be utilised, or more than two memories. A processing node may have access to twelve memories, or even more in certain configurations. One example of a suitable external memory are DRAMs 700, for example arranged in DIMMs. The DRAMs may be DDR (double date rate) memories. Each processing node P1, P2, P3, P4 also has its own internal or local memory. To simplify the diagram, only the local memory LM1 of P1 is shown. It will readily be appreciated that each of the processing nodes P2, P3 and P4 also have their own internal or local memories. Although not illustrated, these will be referred to as LM2, LM3, LM4 respectively. In FIG. 7, the physical connection between the processing node and the external memory M1$a$, is labelled 100$a$. An additional physical connection 100$b$ is shown connecting to another external memory M1$b$ (not shown in FIG. 7).

Each processing node P2, P3 and P4 is also connected to their respective external memories using physical external processor—memory connections, in a manner similar to that of P1.

Each processing node is connected to each of its two neighbours by physical inter-processor connections, for example bi-directional links. In this context, a bi-directional link is a link which allows the passage of data simultaneously in both directions. That is, the link L1,2 between processing node P1 and processing node P2 can simultaneously transmit data from P1 to P2 and from P2 to P1.

The processing node P2 is connected to the processing node P3 by a physical communication link L2,3. The processing node P3 is connected to the processing node P4 by a physical communication link L3,4. The processing node P4 is connected to the processing node P1 by a physical communication link L4,1. As with link L1, 2, each of these physical links may be bi-directional links.

Each processing node comprises a processor device configured to execute software to carry out functions of the respective processing node. The processor device of the processing node P1 is designated PR1. Each of the processing nodes P2, P3 and P4 comprise their own processor devices, which are not shown for simplification of the diagram.

Software for executing on the local processor device PR1 of the processing node P1 may be stored in a memory of the processing node. That memory may be the local memory LM1, or other computer readable storage external or internal to the processing node. Note that, as discussed in more detail later, when the software for executing on the computer is compiled, it is compiled for all of the processor devices provided on the processing nodes. That is, at the time of compilation it is determined what functions each processing node will be carrying out at what time, relative to a synchronisation signal or other synchronisation barrier. Computer programs which can thus cooperate are generated and downloaded onto each of the processing nodes to control the functions of the processing nodes described herein.

Certain computer operations require that first data be operated on by a second dataset which may be too large to be held in one memory device.

For the purposes of executing vector multiplication, for example of a machine learning or artificial intelligence model, each external memory holds a portion of a large vector. This vector is referred to herein as the external vector (because it is stored externally of the processor devices). In the embodiment shown in FIG. 3, the first external memory of processing node P1 holds a quarter of the vector. Similarly, the external memories associated with each of the processing nodes P2, P3 and P4 each hold a quarter of the vector. That is, the entire external vector is held in respective portions in the collective external memories of the computer.

In the arrangement shown in FIG. 3, each external memory comprises two memories. In the case of the processing node P1, a first memory is designated M1$a$, and the second memory is designated M1$b$. Each of the first and second memories hold an eighth of the external vector. This is shown V/8, with a respective portion designator indicated in FIG. 3. For example, the portion of the vector stored in the first memory M1$a$ is shown as VPa, and the portion of the vector shown in the second memory M1$b$ is designed VPb. Each portion of the vector is shown stored in its respective external memory of its associated processing node. That is, the processing node P2 has direct access to its external memory to vector portions VPc and VPd. The processing node P3 has direct access to vector portions VPe and VPf in its external memory. The processing node P4 has direct access to vector portions Vpg and Vph in its external memory. It will be understood that the entire vector comprises vector portions MPa . . . MPh.

Each processing node holds in its own local memory data to be operated on with the externally stored data. In the presently described embodiment, the local data forms part of a local dataset. That is, each processing node holds in its individual local memory a portion of a vector which is to be multiplied. This vector may be referred to as the onboard vector. For example, processing node P1 holds a portion of the onboard vector V/4 in its local memory LM1, for example $f_1$ to $f_p$. See FIG. 2. Each processing node holds a separate portion of the onboard vector V0 in its own local memory. In this particular case, each processing node holds a quarter of the onboard vector. That is, processing node P2, processing node P3 and processing node P4 each hold a quarter of the onboard vector in their own local memory.

Note that each portion of the onboard vector may comprise a set of data values which is different to other portions of the onboard vector. In other embodiments, the local data may be particular to that processing node (but needs to be operated on with the external vector).

In order to implement the vector multiplication, each processing node is required to perform an operation on its own vector portion—in this example to multiply its own onboard vector portion $V_O/4$ with a copy of the entire external vector V. Note that the onboard vector portion may be stored locally at its respective processing node in the local memory of that node.

Figure 4:
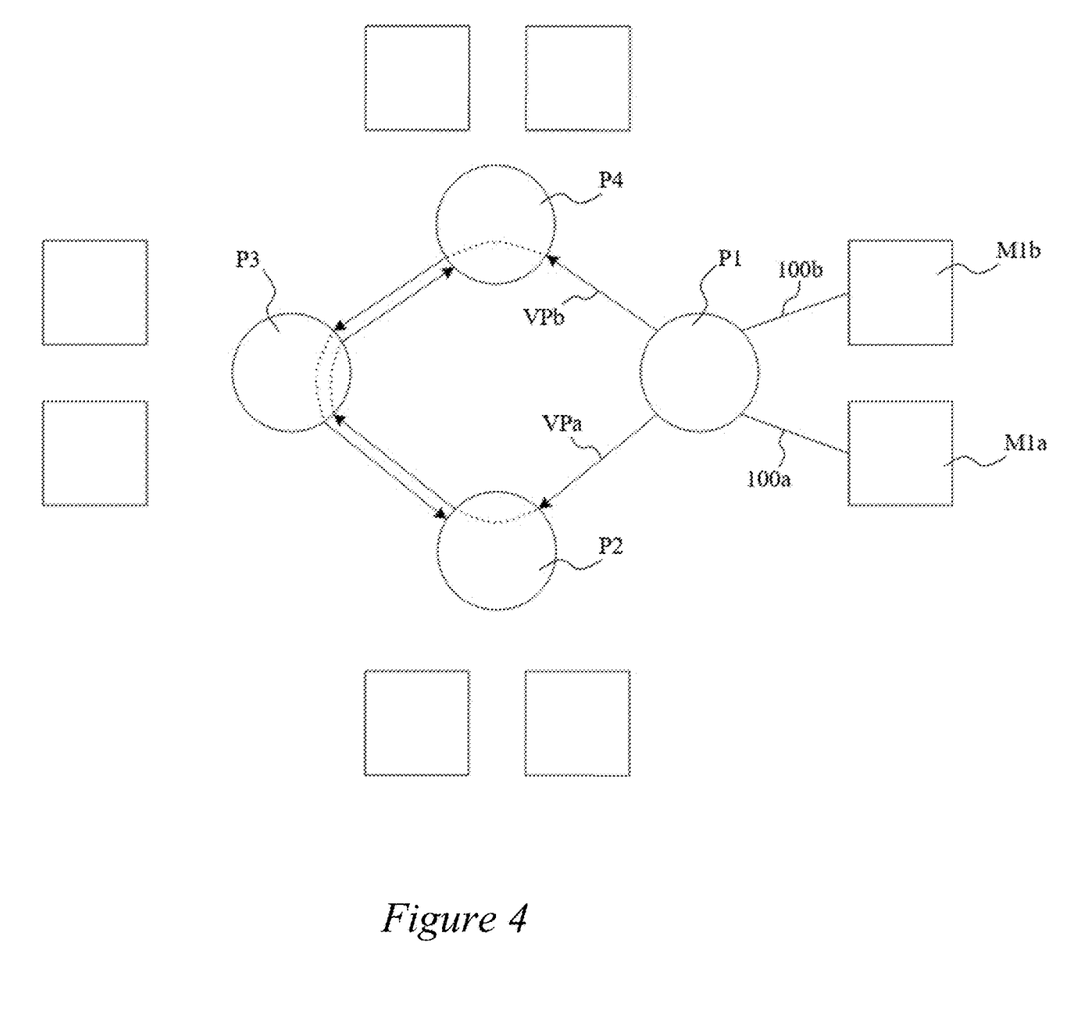
FIG. 4 is a schematic diagram illustrating operation of the architecture of FIG. 3.
Figure 5:
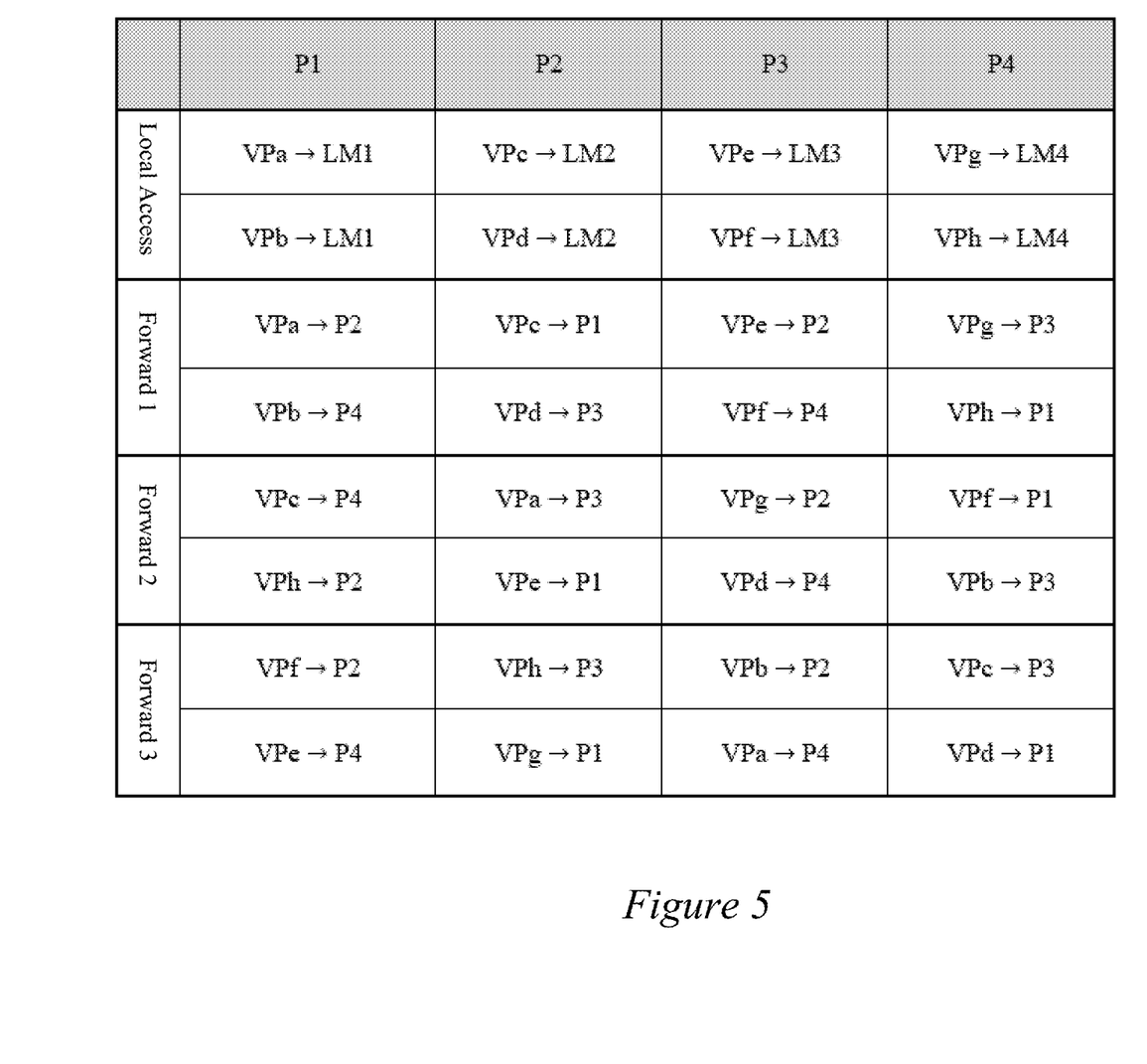
FIG. 5 is a chart showing the timing of forwarding actions by each processing node.
Figure 6:
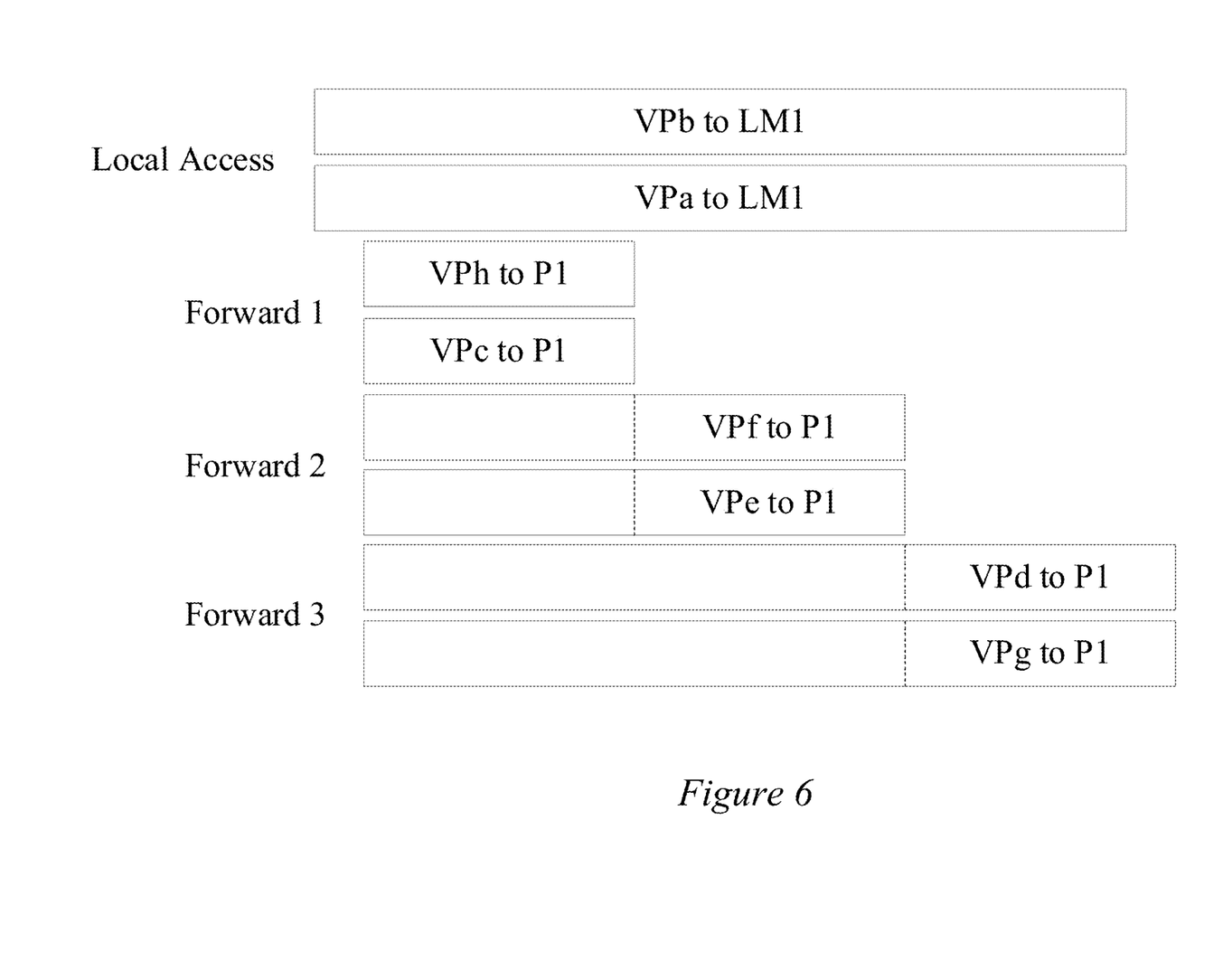
FIG. 6 is a chart showing the forwarding actions to obtain all portions of an externally stored dataset at one processing node.

Reference will now be made to FIG. 4 to explain the process by which each processing node obtains a copy of the entire external vector for the purpose of executing a vector multiplication operation. The processing node P1 accesses its external memory via the physical links 100a, 100b. The processing node starts to stream its portion of the external vector into its local memory. In the case of the processing node P1, it starts to stream vector portions VPa and VPb into its local memory. Due to the bandwidth constraints imposed by the physical connection wires 100a, 100b, this may take a certain time from a start time T0 to a finish time T1 (FIG. 6). As the data is streaming into the local memory LM1, the processing unit PR1 of the processing node P1 is configured to transmit the vector portion MPa to its neighbouring processing node P2 via the physical link L1, 2, and the vector portion VPb to its other neighbouring processing node P4 via the physical link L4, 1. In a first forward action, forward 1, the vector portion VPa reaches the processing node P2 and is stored in the local memory at the processing node P2. In that same forward action forward 1, the vector portion VPb reaches the local memory of the processing node P4 and is stored in that local memory. When the processing node P1 started to access its external memory at T0 to retrieve the vector portions VPa, VPb, each of the other processing nodes P2, P3 and P4 started to access their own external memories to retrieve their own respective vector portions and store them in their local memory. In the first forward action, forward 1, each of those processing nodes also started to transmit their respective vector portions to each of their respective neighbours. As can be seen most readily in FIG. 5, the processing node P2 transmits its vector portion MPc to processing node P1, and its vector portion MPd to processing node P3. The processing node P3 transmits its vector portion MPe to processing node P2, and its vector portion MPf to processing node P4. The processing node P4 transmits its vector portion MPg to processing node P3, and its vector portion MPh to processing node P1.

It will readily be understood that in some embodiments each physical link connecting the processing nodes may carry a vector portion clockwise around the ring and a respective vector portion anti-clockwise round the ring.

In a next forward action forward 2, each processing node transmits the vector portion that it has received to its next neighbour, continuing in the same direction around the ring. That is, in the action forward 2, the processing node P1 transmits the vector portion VPc to processing node P4, and the vector portion VPh to processing node P2. The processing node P2 transmits the vector portion MPa to processing node P3, and the vector portion VPe to processing node P1. The processing node P3 transmits the vector portion VPg to processing node P2, and the vector portion VPd to processing node P4. The processing node P4 transmits the vector portion VPf to processing node P1, and the vector portion vPb to processing node P3.

Figure 2:
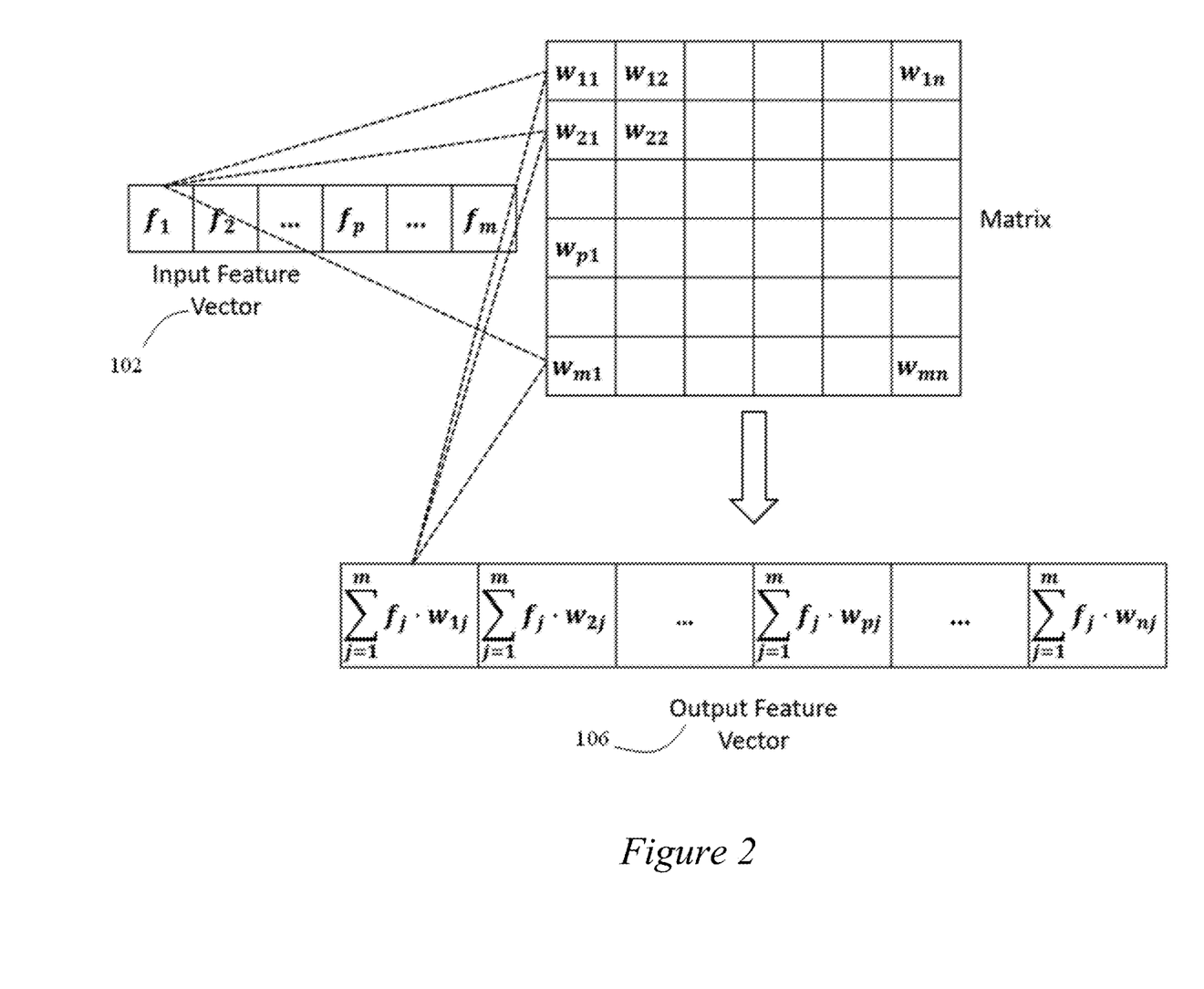
FIG. 2 is a schematic diagram illustrating matrix vector multiplication as one example of an operation in which vector dot products are performed.

In a third, final forward action forward 3, each processing node continues to transmit the vector portion that it has received, while continuing to access and store its own external vector portion in its own local memory, and to store the incoming vector portions from the other processing nodes. After three forwarding actions, each local memory LM1, LM2, LM3, LM4 now holds a full copy of the external vector. The vector multiplication operation can then be effected, with each copy of the external vector being multiplied by the onboard vector portion held in that local memory. The multiplication operation is effected by the local processor PR1, PR2, PR3, PR4 of each node executing a multiplication instruction (e.g. a dot product) of the downloaded computer program. FIG. 6 shows a timing diagram relating to the processing node P1—each processing node has a similar timing diagram. The vector multiplication may be applied in many different contexts. One example is to perform a matrix vector multiplication as illustrated in FIG. 2.

In the implementation of FIGS. 3 to 6, the bandwidth of the physical links connecting each processing node to its external memory is referred to as B. The bandwidth of the physical links connecting the processing nodes to each other may be higher than B, for example the bandwidth may be three times (3B) that of the memory access bandwidth. This is shown in FIG. 4. This means that in the time that it takes to stream a vector portion from the external memory to its local processing node, three forward actions may be implemented. That is, by the finish time T1 within which a processing node has received its own entire vector portion into its local memory, it has also received the vector portions from the other processing nodes.

Figure 8:
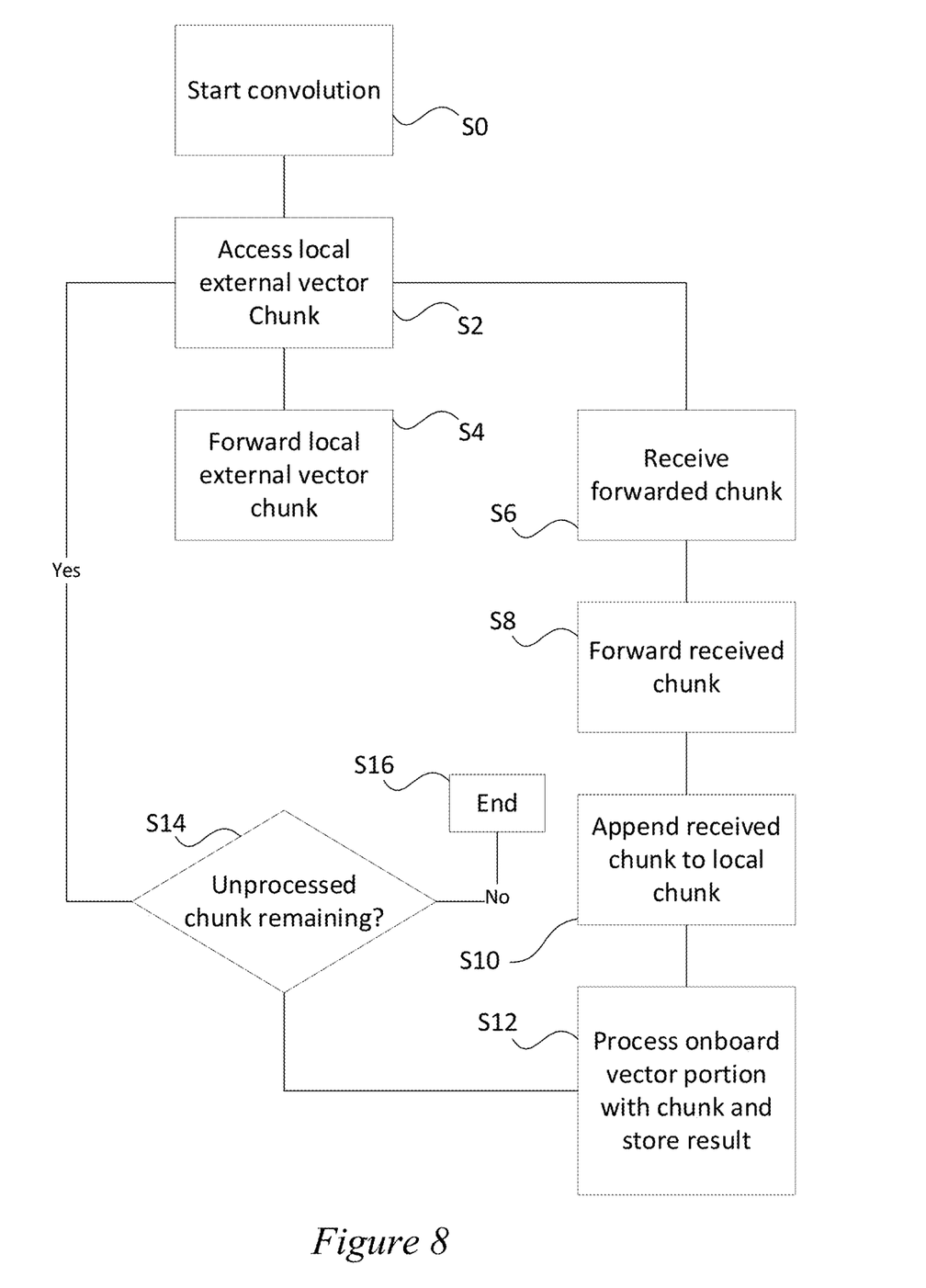
FIG. 8 is a flow diagram illustrating the actions taken at each processing node.

FIG. 8 illustrates the actions which are taken by a processing node P1, P2, P3 or P4. Step S0 denotes the start of the vector multiplication process. At step S2, the processing node accesses a portion of its locally stored external vector. This portion is referred to in FIG. 8 and its description as a chunk. At step S4, the processing node forwards this local chunk to its adjacent processing nodes as described. At step S6, the processing node receives chunks which have been forwarded to it by the adjacent processing nodes. Note that embodiments where the links are bi-directional, the step of receiving chunks forwarded from neighbouring processors may take place at the same time as the step of forwarding the locally accessed vector chunk to the neighbouring processing nodes. With bidirectional links in a ring, three things may be going on at the same time, that is in time overlap with one another:

(i) Data input from a clockwise neighbour, copied as output to the other clockwise neighbour.
(ii) Data input from an anticlockwise neighbour, copied as output to the other anticlockwise neighbour.
(iii) Data input from both neighbours written to internal memory or to attached memory for later processing, or processed immediately.

The clockwise and anticlockwise data flows use the same physical links, because in this embodiment they are bidirectional.

These are all "at the same time" in that each vector is sent as a stream, element-wise. An element may arrive at a node while the previous element is being output from that node, or written to that node's internal memory, or processed at that node. If the vector has many elements, all these things substantially overlap during the course of receiving the vector, so they are effectively in parallel (or "at the same time").

Note that the processor may treat the arrival of one vector as one BSP step, or split it into several BSP steps. This does not affect the carrying out of the above actions "at the same time."

At step S8, the processing node forwards the chunk which it has now received to its adjacent neighbouring nodes. At step S10 it appends the chunk that is received to its locally accessed chunk. Note that steps S8 and S10 could be carried at the same time, because one requires a local internal processing action at the processing node, and the other requires a transmission action which could be carried out at a transmission interface of the processing node. At step S12, the processing node processes its local of the external vector onboard vector portion with the locally accessed chunk appended to the received chunks. The convolved vector portion may be stored locally at that processing node. At step S14 it is ascertained whether there are still unprocessed chunks of the external vector remaining. If there are, the process returns to step S2. If there are not, the process ends.

Aspects of the present invention have been developed in the context of a multi-tile processor which is designed to act as an accelerator for machine learning workloads. The accelerator comprises a plurality of interconnected processing nodes. Each processing node may be a single multi-tile chip, a package of multiple chips or a rack of multiple packages. The aim herein is to devise a machine which is highly efficient at deterministic (repeatable) computation. Processing nodes are interconnected in a manner which enable functions (operations) involving large data sets to be efficiently implemented. It is noted, however, that embodiments of the invention describe herein may have other applications.

The described computer and method may be used in convolution operations, such as vector multiplication which may be used when training a neural network, or when using a trained neural network.

Machine learning processing algorithms may involve applying convolutions at each of one or more layers of a deep learning model.

When processing data in machine learning/artificial intelligence processing systems, an operation which is frequently required is a convolution operation. A convolution operation applies the same transform operation to different elements of a data vector to produce a new data vector. A data vector may be a vector comprising a sequence of data elements. However, in most deep learning applications, a data vector is a "vector of vectors", wherein each element of the vector is itself a vector of data items. For example, in the field of natural language processing, a sequence of tokens is derived from a sequence of words, each vector comprising a sequence of tokens to be processed. In image processing, each data element of the vector may represent values relating to a pixel or group of pixels from an image. In deep learning networks, a layer-by-layer transformation is carried out on a sequence of data elements to deliver an outcome from the deep learning network. At each layer, the same transformation is applied to each of the data elements in the data vector provided as an input to that layer.

Figure 1:
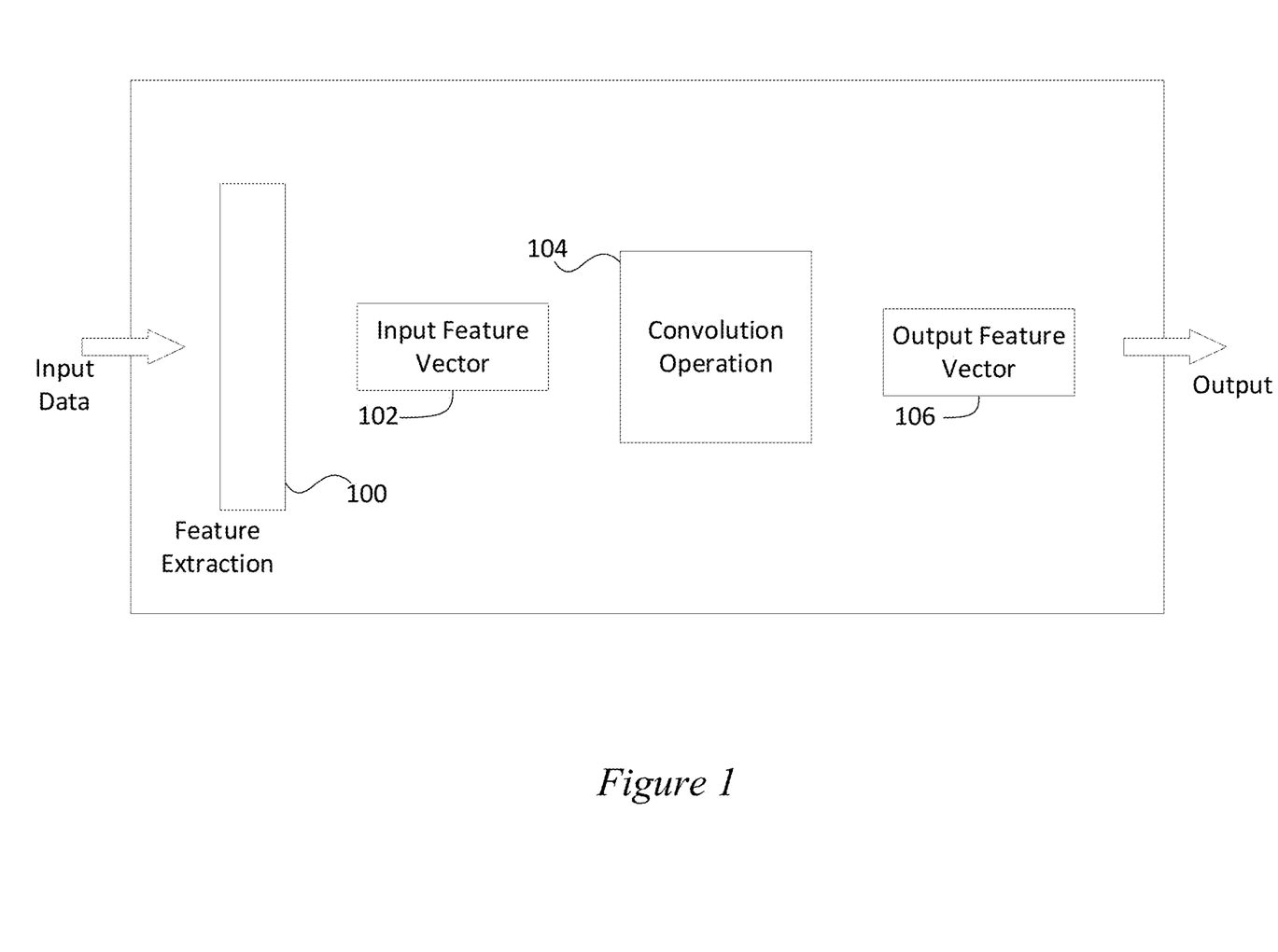
FIG. 1 is a schematic diagram illustrating a convolution operation as examples of an operation to be executed by a computer.

In deep learning models, each data element of a vector may comprise a feature of the model. Each vector has a length corresponding to the feature dimension of the model. At each layer in the model, each feature is subject to the same transform operation. Each layer of the model has a set of parameters, e.g. weights which define the transform operation of that layer. FIG. 1 is schematic diagram showing the context of a convolution operation. Input data is applied to a feature extraction module 100, which provides an input feature vector 102. The input feature vector 102 for each layer is subject to a transform operation 104 using the parameters of that layer to generate an output feature vector 106 of that layer. As mentioned above, the transform operation is referred to as a convolution operation. In many instances of deep learning, the convolution operation is a vector multiplication operation which multiplies the feature vector by a vector. The vector may represent the parameters of a particular layer. . . . As explained, it is necessary to apply the same vector to each feature of the feature vector. Noting that the size of matrices corresponds to the square of the feature dimension, matrices can be extremely large. Note that other operations may require similarly very large datasets to be applied to the feature vector of each layer of a deep learning model.

While convolutions are applied both in training a deep learning network, and in using the deep learning network after it has been trained, there is a particularly onerous requirement during the training phase due to the large datasets which are required for training, and therefore the amount of times that convolutions need to be carried out for effective training.

As described herein, each processing node is capable of implementing a processing or compute function. Each node could be implemented as a single processor. It is more likely, however, that each node will be implemented as a single chip or package of chips, wherein each chip comprises multiple processors. There are many possible different manifestations of each individual node. Graphcore have developed a intelligence processing unit (IPU) which is describe for example in U.S. patent applications Ser. Nos. 15/886,009; 15/886,053; 15/886,131 the contents of which are herein incorporated by reference. The IPU comprises a plurality of tiles on a silicon die, each tile comprising a processing unit with local memory. The tiles communicate with each other using a time deterministic exchange. Each tile has instruction storage holding a local program, an execution unit for executing the local program, data storage for holding data, an input interface with a set of input wires and an output interface with the set of output wires. A switching fabric (sometimes referred to as an exchange or exchange fabric) is connected to each of the tiles by the respective sets of output wires and connectable to each of the tiles by their respective sets of input wires via switching circuitry controllable by each tile. A synchronisation module is operable to generate a synchronisation signal to switch between a compute phase and an exchange phase. The tiles execute their local programs in the compute phase according to a common clock which may be generated on the die or received by the die. At a predetermined time in the exchange phase, a tile may execute a send instruction from its local program to transmit a data packet onto its output set of connection wires, the data packet being destined for at least one recipient tile but having no destination identifier. At a predetermined switch time, the recipient tile executes a switch control instruction from its local program to control the switching circuitry to connect its inputs set of wires to the switching fabric to receive the data packet at a receive time. The transmit time at which the data packet is scheduled to be transmitted from the transmitting tile, and the predetermined switch time, are governed by the common clock with respect to a synchronisation signal with respect to the synchronisation signal.

The time deterministic exchange allows for efficient transfer between the tiles on the die. Each tile has its own local memory which provides the data storage and the instruction storage. As described herein, the IPU (or multiple IPU package) is connected to external memory from which data may be transferred onto the IPU and used by the tiles.

When connecting an IPU die (or multiple IPU package) to one or more external memory, the present techniques overcome challenges posed by bandwidth constraints.

Note, however, that the techniques described herein may be used on any type of processor constituting the nodes. What is outlined herein is a method of accessing data in an efficient manner to enable high bandwidth access to high capacity memories.

The links between the processing nodes could be manifest in any suitable way. It is advantageous that they are bi-directional and preferable that they can operate in both directions at once, although this is not an essential requirement. One particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

SERDES PHYs are full duplex (that is a 16 Gbit per second PHY supports 16 Gbits per second in each direction simultaneously), so full link bandwidth utilisation implies balanced bidirectional traffic.

The inter-processing node links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. The external memories may be external to the chips, connected using wires supported by the board.

Any suitable physical connection or link may be used for carrying memory access messages between the processing node and its connected one or more external memory. In the context of the Graphcore IPUs, a so-called E link has been developed for carrying high bandwidth IO data between the IPU and its connected memory. This is a non-storable, pipelined, flow controlled simplex point-to-point link which supports a set of packet formats including memory read packets and memory write packets for reading data from and writing data to the memory respectively. In the techniques and architecture described herein, memory read packets may be used to access the local portion of the external vector to provide it to the processing node for recording in the local memory of the processing node. In certain embodiments, the data width may be a 128 bits at speeds of up to 1 Gh, matching the bandwidth offered by an ethernet external link (100 Gb/sec) or by a PCI Gen 4 link (128 Giga bits/sec).

In one example, there are four IPU chips forming a linked ring, each chip having:
(i) two DDRS-6400 memory ports, each providing 50 GB/s half-duplex (ie. in one direction at a time) giving a total bandwidth of 100 GB/s for memory read or write;
(ii) twenty four links, twelve to each neighbour in the ring, each link made of two 50 Gb/s SERDES, that is 2.5 GB/s, full-duplex (ie. in both directions simultaneously) giving a b and width of 150 GB/s clockwise and another 150 GB/s anti-clockwise around the ring.

This 3:1 bandwidth ratio is well-balanced for a ring of four chips. It allows all four chips to read ¼ of a common vector from their memory, and to simultaneously circulate those vector parts around the ring of links (half in each direction), so that each chip receives a copy of the whole vector at four times the bandwidth of its own memory. Because only ¼ of the vector is coming from its own memory, and ¾ is coming over the links at three times the bandwidth from the other chips, where the memory streams and the link streams all substantially overlap.

In practice, current DDRS ports are 64 b wide, so the -6400 speed grade is normal—nominally it provides 6.4 GHz×8B=51.2 BG/s but in practice is somewhat reduced, so the estimate of "50 GB/s" is used in the above example. 56 Gb/s SERDES are currently in mainstream use for eg. 100G Ethernet, where two such lanes are used (as for the links above)—a difference between 50 and 56 is assumed to allow for protocol overheads.

In order to use the computer system described herein, the actions of the processing nodes need to be co-ordinated. In some embodiments, this may be done by generating a set of parallel programs are generated. The set of parallel programs contain node level programs, that is programs designated to work on particular processing nodes. The set of parallel programs to operate on a particular network computer may be generated by a compiler. It is the responsibility of the compiler to generate node level programs which correctly define the links to be used for each data transmission step for certain data, and the time of using the links relative to a synchronisation barrier. These programs include one or more computer readable instruction for effecting data transmission in a data transmission stage which uses a link identifier to identify the link to be used for that transmission stage. For example, a processing node may have two active links at any one time (double that if the links are simultaneously bidirectional). The link identifier causes the correct link to be selected for the data items for that transmission stage. Note that each processing node may be agnostic of the actions of its neighbouring nodes—the exchange activity is pre-compiled for each transmission stage. In certain embodiments, the transmission stage may be effected in an exchange phase of a BSP system, discussed below.

In other embodiments, the four processing nodes may be synchronised using any kind of synchronisation technique, without the timing being controlled at compile time.

One scheme for achieving synchronisation is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using a message passing interface standard (MPI) which has been established for parallel computing The "ring" arrangement of the processing nodes can be implemented in any topology of interconnected processing nodes.

Reference is made for example to the following Graphcore applications, the contents of which are herein incorporated by reference, which describe different topologies in which processing nodes operate in rings.

U.S. Ser. No. 16/831,590
U.S. Ser. No. 16/831,580
U.S. Ser. No. 16/831,617
U.S. Ser. No. 16/831,572
U.S. Ser. No. 16/831,630
U.S. Ser. No. 17/211,232
U.S. Ser. No. 16/831,564

Embodiments of the invention could be implemented in any known topology, including toroid and non toroid topological architectures.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A computer for executing an operation on locally stored data and an externally stored dataset, the computer comprising:
   a plurality of processor devices, each of the processor devices having local memory and being connected to at least one external memory device via a physical processor-memory link,
   the processor devices being connected in a ring wherein each of the processor devices is connected to each of two neighbouring ones of the processor devices by a respective physical inter-processor link,
   wherein the local memory of each processor device holds locally stored data,
   wherein each external memory device stores a local portion of the externally stored dataset, the externally stored dataset being collectively stored in the external memory devices connected to the plurality of processor devices, and wherein
   a first processor device of the plurality of processor devices is configured to execute computer readable instructions of a computer program which operates the computer according to the following method:
   determining that a synchronisation point has been reached by the plurality of processor devices of the computer,
   responsive to the determination, accessing from a first external memory device by a first physical processor-memory link a local portion of the externally stored dataset stored in the first external memory device
   recording a copy of the local portion of the externally stored dataset in a first local memory of the first processor device,
   transmitting the local portion of the externally stored dataset to a first connected neighbouring processing device of the plurality of processing devices, and
   receiving an incoming portion of the externally stored dataset from a second connected neighbouring processing device, the incoming portion being a further local portion held in a second external memory device connected to the second connected neighbouring device whereby, for execution of the operation, each of the plurality of processor devices has recorded in respective local memory a copy of all portions of the externally stored dataset for operating on respective locally stored data.

2. The computer of claim 1 wherein a bandwidth of each inter-processor link is greater than a bandwidth of each physical processor-memory link.

3. The computer of claim 2 wherein the plurality of processor devices comprises four processor devices which are connected in the ring, wherein the bandwidth of each inter-processor link is three times as large as the bandwidth of each physical processor-memory link.

4. The computer of claim 1 wherein the locally stored data comprises an onboard vector.

5. The computer of claim 4 wherein the externally stored dataset comprises an external vector and wherein the operation is a vector multiplication.

6. The computer of claim 5 wherein the vector multiplication comprises a dot product.

7. The computer of claim 1 wherein transmitting the local portion of the externally stored dataset comprises transmitting the local portion of the externally stored dataset to multiple connected neighbouring processing devices.

8. The computer of claim 1 wherein the inter-processor links are bi- directional links configured to support data transmission in two directions at a same time.

9. The computer of claim 1 wherein each processor device comprises a plurality of interconnected processing tiles, each processing tile storing part of the locally stored data.

10. The computer of claim 1 wherein the first processor device is configured to record the incoming portion of the externally stored dataset in the first local memory and to transmit the incoming portion of the externally stored dataset to the first connected neighbouring processing device.

11. A processor device comprising:
   at least one execution unit configured to execute computer readable instructions;
   a local memory;
   a first interface configured for connection to a first physical inter-processor link for connecting the processor device to a first neighbouring processing device of a computer;
   a second interface configured for connection to a second physical inter-processor link for connecting the processor device to a second neighbouring processing device of the computer;
   a third interface configured to connect the processor device to a memory device via a physical processor-memory link, the processor device configured to execute computer readable instructions to implement the following method:
   determining that a synchronisation point has been reached by a plurality of processor devices in the computer in which the processor device is connected;

responsive to the determination, accessing via the physical processor-memory link a local portion of an externally stored dataset stored in at least one external memory device connected via the physical processor-memory link, recording a copy of the local portion of the externally stored dataset in the local memory, transmitting the local portion of the externally stored dataset from the first interface and receiving an incoming portion of the externally stored dataset via the second interface from a neighbouring processing device of the computer and recording the incoming portion of the externally stored dataset in its local memory, transmitting the incoming portion of the externally stored dataset via the first interface; and performing an operation using all portions of the externally stored dataset and the locally stored data.

12. A computer for executing an operation to apply an external vector to an onboard vector, the computer comprising:

four processor devices, each processor device having local memory and being connected to two external memory devices via respective physical processor-memory links, each of the processor devices being further connected to each of two neighbouring processing devices of the computer via respective physical inter-processor links, whereby the four processor devices are connected in a ring, wherein a bandwidth of each inter-processor link is three times a bandwidth of the physical processor memory link, each local memory storing a portion of the onboard vector, the onboard vector being collectively stored in the local memories of the four processor devices of the computer, each external memory device storing a local portion of the external vector, the external vector being collectively stored in the external memory devices, a first processor device of the four processor devices being configured to execute computer readable instructions of a computer program which operates the computer according to the following method:

determining that a synchronisation point has been reached by the four processor devices, responsive to the determination, accessing from two of the external memory devices a first two local portions of the external vector, recording the first two local portions of the external vector in a first local memory, transmitting the first two local portions of the external vector to each of two connected neighbouring processor devices and receiving from each of the two neighbouring processor devices an incoming portion of the external vector, the incoming portion being a further local portion of the external vector held in further ones of the memory devices connected to each of the two neighbouring processor devices.

13. The computer of claim 12 wherein the first processor device is configured to record in the first local memory the incoming portion of the external vector received from a first one of the two connected neighbouring processor devices and to transmit the incoming portion to a second one of the two connected neighbouring processor devices.

14. A method of operating a computer to execute an operation on locally stored data and an externally stored dataset, the method comprising:

causing a first processor device to determine that a synchronisation point has been reached by a plurality of processor devices of the computer, the plurality of processor devices including the first processor device, responsive to the determination, accessing from at least one external memory device connected to the first processor device a local portion of an externally stored dataset, the local portion of the externally stored dataset being stored in the at least on external memory device, wherein the accessing is carried out via a physical processor memory-link connecting the first processor device to the at least one external memory device, recording a copy of the local portion of the externally stored dataset in a local memory of the first processor device, transmitting the local portion of the externally stored dataset to a second processor device which is connected to the first processor device via a first physical inter-processor link, receiving an incoming portion of the externally stored dataset from a third processor device, the third processor device connected to the second processor device via a second physical inter-processor memory link, and executing the operation using all portions of the externally stored dataset and locally stored data.

15. The method of claim 14 wherein the first processor device is caused to implement the method by executing computer readable instructions of a computer program, the computer program being distributed over the plurality of processor devices of the computer.

16. The method of claim 14 comprising recording in the local memory of the first processor device the incoming portion of the externally stored dataset and transmitting the incoming portion of the externally stored dataset to the second processor device.

17. The method of claim 14 wherein the accessing, the recording, the transmitting and the receiving are carried out in an exchange phase of a bulk synchronisation protocol.

18. The method of claim 17 wherein the operation is carried out in a compute phase of the bulk synchronisation protocol.

19. The method of claim 14 wherein each processor device of the plurality of processor devices is configured to access a respective local portion of the externally stored dataset at a same time and responsive to the determination that the synchronisation point has been reached.

20. Non-transitory computer readable media on which is stored computer readable instructions which cause a processor device to implement the following method:

determining that a synchronisation point has been reached by a plurality of processor devices in the computer in which the processor device is connected;

responsive to the determination, accessing via a physical processor-memory link a local portion of an externally stored dataset stored in at least one external memory device connected to the processor device via the physical processor-memory link, recording a copy of the local portion of the externally stored dataset in a local memory, transmitting the local portion of the externally stored dataset from a first interface to a first connected processor device, receiving an incoming portion of the externally stored dataset from a second connected processor device via a second interface, and recording the incoming portion of the externally stored dataset in the local memory, transmitting the incoming portion of the externally stored dataset via the first interface; and performing an operation using all portions of the externally stored dataset and the locally stored data.

\* \* \* \* \*